US005443328A

United States Patent [19]

Alcock et al.

[11] Patent Number: 5,443,328

[45] Date of Patent: Aug. 22, 1995

[54] CONNECTING APPARATUS

[75] Inventors: John M. Alcock, Ulverston; Joseph A. Nicholson, Broughton-in-Furness; Trevor J. Thistlethwaite, Pennington; Fred D. Myers, Ulverston, all of United Kingdom

[73] Assignee: Tronic Electronic Services Limited, Ulverston, United Kingdom

[21] Appl. No.: 87,706

[22] PCT Filed: Jan. 10, 1992

[86] PCT No.: PCT/GB92/00057

§ 371 Date: Sep. 17, 1993

§ 102(e) Date: Sep. 17, 1993

[87] PCT Pub. No.: WO92/12554

PCT Pub. Date: Jul. 23, 1992

[30] Foreign Application Priority Data

Jan. 11, 1991 [GB] United Kingdom ................. 9100634

[51] Int. Cl.[6] ......................... H01R 13/00; F16L 1/26

[52] U.S. Cl. .................................... 405/169; 405/191

[58] Field of Search ............... 405/158, 169, 170, 185, 405/190, 191, 195.1, 224; 166/338, 341, 349

[56] References Cited

U.S. PATENT DOCUMENTS

| | | | |
|---|---|---|---|
| 2,750,569 | 6/1956 | Moon . | |
| 4,094,567 | 6/1978 | Karcher et al. . | |
| 4,174,875 | 11/1979 | Wilson et al. . | |
| 4,708,524 | 11/1987 | Goris | 405/169 |
| 4,878,783 | 11/1989 | Baugh | 405/169 |
| 4,906,136 | 3/1990 | Norbom et al. | 405/169 |

FOREIGN PATENT DOCUMENTS

| | | |
|---|---|---|
| 0235365 | 9/1987 | European Pat. Off. . |
| 0251655 | 1/1988 | European Pat. Off. . |

*Primary Examiner*—David H. Corbin
*Attorney, Agent, or Firm*—Chilton, Alix & Van Kirk

[57] ABSTRACT

Apparatus (1) for connecting first (9) and second (33) parts of an under-water connector comprises a first carrier (2) adapted to receive the first connector part (9) and having an axial guide socket (10), and a second carrier (3) adapted to receive the second connector part (33) and having a plug (4) arranged to engage axially in the guide socket (10) for connection of the first (9) and second (33) connector parts. The plug (4) has a nose portion (14) which tapers forwardly to a front end (15) having a lateral dimension less than that of the guide socket (10), and a waisted portion (16) rearwardly of the nose portion (14) with a lateral dimension less than that of the guide socket (10).

23 Claims, 13 Drawing Sheets

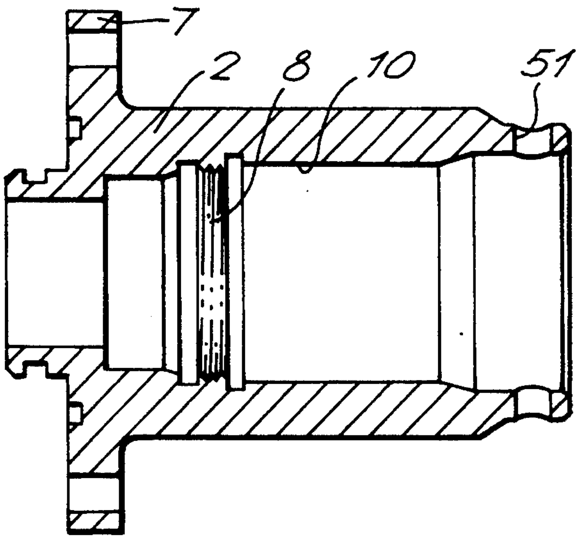
FIG. 7.
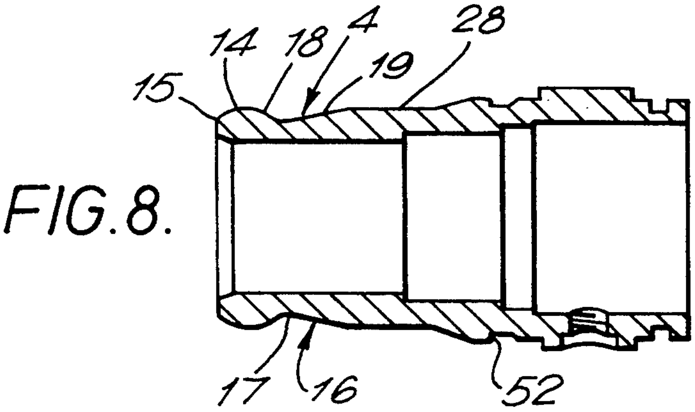
FIG. 8.
FIG. 9.
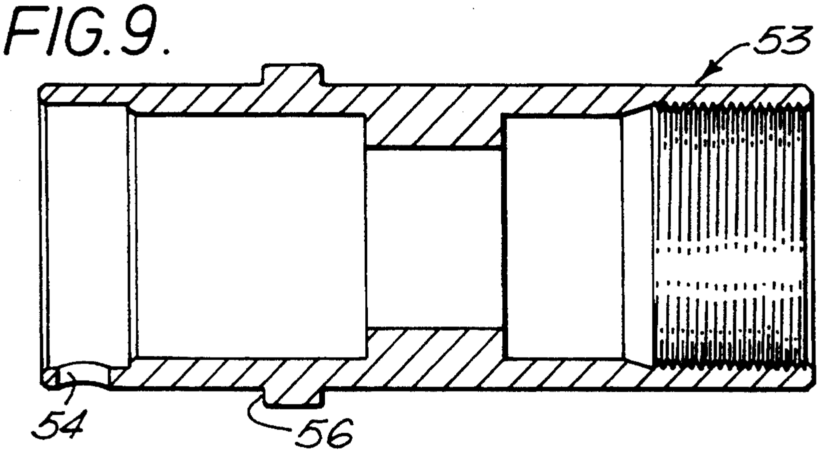

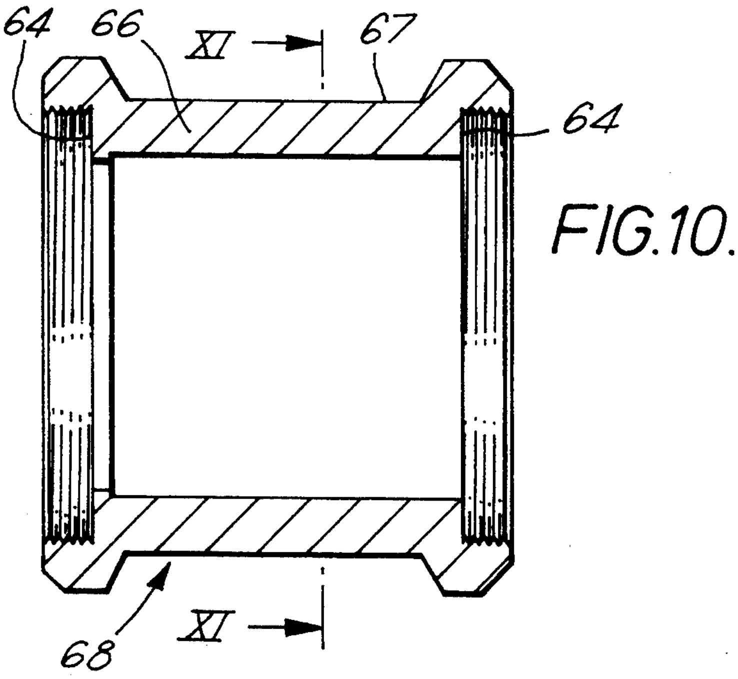
FIG. 10.
FIG. 11.
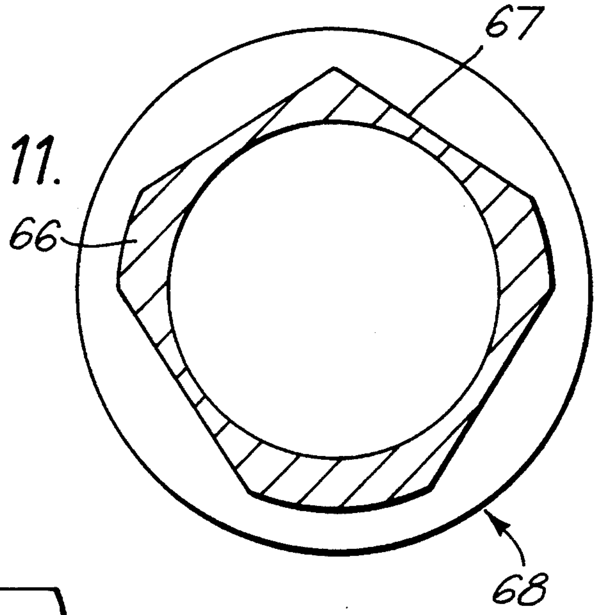
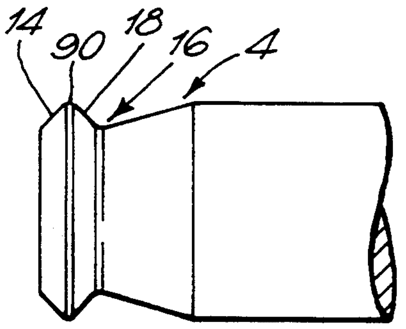
FIG. 13.

CONNECTING APPARATUS

The invention relates to apparatus for connecting first and second connector parts of an under water connector for transmission of electrical, hydraulic, air, optical or other services.

It is known in the oil industry to connect up services at under water sites such as a well head installed on the sea bed. It is known from GB-A-2 192 316 to provide an under water electrical connector having a first part provided with a mating socket surrounding a set of electrical contact pins and a second part provided with a mating plug which houses a corresponding set of electrical contact terminals. The plug has a cylindrical outer surface designed to fit precisely in the socket which is also cylindrical, there being a pin and keyway arrangement to ensure correct circumferential alignment between the parts. In use, the first part of the connector is normally secured to a sea bed installation and the second part is mated with the first part by a diver who inserts the plug into the socket, whereby the contact pins make electrical contact with the contact terminals.

In some circumstances, for example in deep water, it may be preferred to use a remotely operated vehicle (ROV) rather than a diver to make the connection and problems then arise in achieving the precise alignment of the two connector parts necessary to mate them together. The major problem in this respect is angular misalignment in the axial direction. The tolerance for another known connector having cylindrical mating portions is a maximum angular misalignment in the axial direction of 1.75°. It can be very difficult to control the manipulator claw of a ROV with sufficient precision to fall within this tolerance. A further problem is circumferential misalignment; this is not overcome by a simple pin and keyway arrangement since if there is initial misalignment the pin will not engage in the slot. Thus it is usual for the ROV to make several attempts at effecting the connection with the operator at a remote location making adjustments after each attempt, sometimes aided by a television camera.

Viewed from one aspect the invention provides apparatus for connecting first and second parts of an under water connector, comprising a first carrier adapted to receive the first connector part and having an axial guide socket, and a second carrier adapted to receive the second connector part and having a plug arranged to engage axially in the guide socket for connection of the first and second connector parts, wherein the plug has a nose portion which tapers forwardly to a front end having a lateral dimension less than that of the guide socket, and a waisted portion rearwardly of the nose portion with a lateral dimension less than that of the guide socket.

With such an arrangement, the tapered nose portion enables the plug to enter the socket even if the first and second carriers are brought together with an angular misalignment in the axial direction. As the plug moves further into the socket, the waisted portion of the plug engages the edge of the socket at its open end and this engagement, with continued forward movement of the plug into the socket, tends to bring the first and second carriers into axial alignment. Thus the connecting apparatus is particularly suitable for operation by a ROV since a relatively large amount of angular axial misalignment, which commonly arises when using a ROV to engage one connector part with another, is tolerated and automatically corrected. For example, the axes of the first and second carriers may be at an initial angle to each other of 30° which is reduced to zero as alignment is achieved.

The socket and the plug will normally be of circular cross-section. The plug preferably has to the rear of the waisted portion a shank portion of diameter D which fits closely within the socket to achieve final axial alignment during connection. The tapering nose portion may be rounded, for example part-spherical, or it may be of frustoconical form, having a straight chamfer as viewed in axial section. Thus there may be a non-linear or a linear reduction in diameter towards the front end of the nose portion. The diameter of the nose portion at its rear end is preferably the same as that of the shank portion, fitting closely within the socket, the nose portion tapering forwardly to a minimum which may be of the order of 0.7D to 0.9D, e.g. 0.85D. Rearwardly of the nose portion, the waisted portion has a front part which reduces to a minimum diameter which may be of the order of 0.7D to 0.9D and may for example be substantially equal to that of the nose portion minimum diameter. The waisted portion then has a rear part of increasing diameter in the rearward direction. It is this rear part which, if there is angular axial misalignment during the connection operation, the edge of the socket at its open end will engage to cause the misalignment to be corrected. The rear part of the waisted portion is preferably of frustoconical form.

Apart from the problem of angular axial misalignment when using a ROV to bring together connector parts under water, there is also the problem of circumferential misalignment. Thus there may be provided means for correcting circumferential misalignment of the first and second carriers. The connecting apparatus therefore preferably includes a pin provided on one of the two carriers for engagement during connection with a slot provided on the other carrier, the slot having an open end for first receiving the pin during connection and being wider than the pin, and the slot narrowing from the open end so as to guide the pin to a desired circumferential position during connection. Thus the slot may be substantially funnel shaped. With such an arrangement circumferential misalignment is automatically corrected as the first and second carriers are brought together, by causing relative rotation of the two carriers. Thus, the pin and slot arrangement is of independent inventive significance.

Accordingly, viewed from another aspect the invention provides apparatus for connecting first and second parts of an under water connector, comprising a first carrier adapted to receive the first connector part and having an axial guide socket, a second carrier adapted to receive the second connector part and having a plug arranged to engage axially in the guide socket for connection of the first and second connector parts, and a pin provided on one of the two carriers for engagement during connection with a slot provided on the other carrier, the slot having an open end for first receiving the pin during connection and being wider than the pin, and the slot narrowing from the open end so as to guide the pin to a desired circumferential position during connection.

The width of the slot open end may vary but should be sufficient to cope with the amount of circumferential misalignment likely to be encountered when using a ROV to bring together the first and second carriers.

Considering the width of the slot open end in terms of the angle subtended at the axis of the respective carrier, this may be as much as 180°, and in one preferred embodiment the angle is 30°. If there is a relatively large degree of circumferential misalignment the pin will engage a side wall of the slot at the point of first entry; for smaller misalignments the engagement against the side wall will take place further along the slot.

The slot is preferably substantially Y-shaped, having a funnel shaped portion followed by an elongate keyway parallel to the axial direction. Thus during connection, any circumferential misalignment is corrected by the funnel shaped portion as the pin approaches the elongate keyway, and the pin then moves along the keyway as the nose portion engages further in the guide socket. In a preferred embodiment, the slot is provided on the first carrier and the pin on the second carrier.

The arrangement of the pin and slot for correcting circumferential misalignment is preferably such that the necessary relative rotation of the first and second carriers will take place only after any angular axial misalignment has been corrected. This helps to prevent seizure during connection. Thus for example the relative locations of the pin and slot on their respective carriers may be such that during connection the pin first enters the slot once the nose and waisted portions of the plug have entered the guide socket. In the preferred embodiment in which the slot is provided on the first carrier and the pin on the second carrier, the pin may be provided on the plug at a location rearwardly of, and preferably adjacent to, the waisted portion.

The tapering nose portion of the plug will help to correct any small lateral misalignment between the first and second carriers during the connection operation, as well as the angular axial misalignment discussed above. In some circumstances, it may be necessary to allow for larger lateral misalignments, and accordingly in one preferred embodiment the second carrier includes a guide cone which converges towards the guide socket.

It is desirable that the two carriers for the first and second connector parts should lock together when the connector parts are connected together, and therefore the connecting apparatus preferably includes suitable locking means.

In one preferred arrangement the locking means comprises a locking member, such as a ring, provided on one of the two carriers and resiliently engageable in a recess, such as a groove, provided on the other carrier. Preferably the locking member is provided on the plug of the second carrier and the recess is formed in the axial guide socket of the first carrier. Such a locking system operates in a simple push/pull manner. It will preferably be designed to allow disconnection at a predetermined pulling force of e.g. 150–200N.

In another preferred arrangement there is provided a locking member movable to a position locking together the first and second carrier parts, and retaining means provided on one of the carriers and operable by axial movement thereof towards the other carrier to retain the locking member in the locking position, and operable by axial movement thereof away from the other carrier to release the locking member. With such an arrangement, when the connecting apparatus is to be operated by a ROV, simple axial movements performed by the manipulator claw of the ROV are effective to lock and unlock the first and second carriers to and from each other. This is a significant improvement over known systems requiring more complex actions for locking and unlocking, such actions being difficult to perform successfully by a ROV and thus sometimes necessitating the use of a diver. Thus, the locking arrangement is of independent inventive significance.

Accordingly, viewed from another aspect the invention provides apparatus for connecting first and second parts of an under water connector, comprising a first carrier adapted to receive the first connector part and having an axial guide socket, a second carrier adapted to receive the second connector part and having a plug arranged to engage axially in the guide socket for connection of the first and second connector parts, a locking member movable to a position locking together the first and second carrier parts, and retaining means provided on one of the carriers and operable by axial movement thereof towards the other carrier to retain the locking member in the locking position, and operable by axial movement thereof away from the other carrier to release the locking member.

The locking member is preferably laterally movable into the locking position by a camming action thereon effected by the retaining means moving axially towards the other carrier. The locking member is preferably arranged to lock the plug directly to the socket. The locking member may be housed either in the first carrier or the second carrier, with a locking recess being provided in the other carrier for receiving the locking member in its locking position. The locking member may be in the form of a locking ball. A plurality of locking members may be provided at circumferentially spaced locations about the first or second carrier.

In one preferred form of the invention the first carrier has a stop for limiting movement of the plug into the guide socket, and the second carrier further comprises a slider adapted to receive the second connector part and being slidable in an axial passage of the second carrier, the arrangement being such that during connection the plug first engages the stop and then the slider slides along the axial passage to connect the second connector part to the first connector part. Such a two-step connecting system is particularly reliable since it ensures that the plug initially adopts a stopped position in the guide socket in which the second connector part is in precise alignment with the first connector part, and thereafter the slider moves from a rear position to a forward position in which the connector parts are connected together. For example, when a ROV is used, engagement of the plug against the stop can establish the position of the ROV, and thereafter the slider is under the precise control of the ROV, the hydraulics of which can be fed at a controlled rate. If a locking member is provided in this preferred arrangement, this may conveniently be housed in a radial passage through a side wall of the plug, with the slider having a cam surface arranged during forward movement of the slider to urge the locking member radially outwardly into locking engagement with the first carrier. Thus the cam surface of the slider acts as the retaining means for the locking member.

Latching means is preferably provided to latch the slider in the forward position thereof, in which the connector parts are connected together. In view of the desirability of being able to disconnect the connector parts by the application of a simple axial force in the disconnecting direction, the latching means is advantageously arranged to unlatch and release the slider when the plug is urged rearwardly.

Resilient means such as a compression spring may be provided to urge the slider rearwardly. Thus once unlatched the slider will be urged to a rear position, unlocking the second carrier from the first carrier, so that axial force in the disconnecting direction can disengage the first and second carriers.

One of the carriers, e.g. the first carrier, will normally be secured to a seabed installation whilst the other carrier, e.g. the second carrier, will normally be brought into its engaged position by a ROV. Initially, the second carrier may be positioned at the site, for example being parked in a well head, or it may be carried to the site by the ROV. In either case, the second carrier may be provided with a handle for engagement by a manipulator claw of the ROV which may include a telescopic boom to assist the connection operation. This may be achieved by the ROV thrusting forwardly to engage the plug axially in the guide socket until it engages the stop, followed by action of the telescopic boom to urge the slider along the axial passage of the plug to connect the second connector part to the first connector part, the latching means then latching the slider in the forward position. For disconnection, the ROV locates and grips the handle of the second carrier and then thrusts rearwardly to release the latch and permit the slider to move rearwardly under the action of the resilient means acting thereon. This disconnects the first and second connector parts and releases the locking member so that rearward thrust of the ROV removes the second carrier from the first carrier.

In another preferred form of the invention, the retaining means is axially movably mounted on one of the carriers and is resiliently biased towards the other carrier, so that when the carriers are brought together and the locking member moves into alignment with the locking recess, the retaining means moves under its resilient bias to urge the locking member to engage in the locking recess. Thus simple axial movement together of the two carriers results in them being locked together.

In such an arrangement, the locking member is preferably provided on the first carrier, and the locking recess and resiliently biased retaining means on the second carrier. The retaining means may take the form of a retaining ring having a cam surface, e.g. at its leading edge, for camming engagement with the locking member during locking. The resilient means may be provided by a compression spring acting on, e.g. the trailing edge of, the retaining ring.

It will normally be necessary to provide suitable means to be gripped by, e.g. a manipulator claw, of a ROV. This may take the form of an axially movable sleeve operably connected to the retaining means such that during connection the retaining means is free to move under its resilient bias to urge the locking member to the locking position, and such that during disconnection the sleeve moves axially on its carrier in the disconnecting direction and carries the retaining means therewith to release the locking member. Once the locking member has been released continued movement of the sleeve in the disconnecting direction disengages its carrier from the other carrier. The sleeve is preferably provided on the second carrier.

Preferably the axial guide socket of the first carrier and/or the plug of the second carrier is provided with support means arranged to permit limited movement of the guide socket and/or the plug relative to a respective support therefor. Thus for example the first carrier may be mounted to a support in the form of a bulkhead of a seabed installation in a manner permitting limited relative movement between the first carrier and the bulkhead. The handle of the second carrier may act as the support for the plug and may be connected to the plug in a manner which permits limited relative movement between the plug and the handle. Thus, when the manipulator claw of the ROV grips the handle, limited relative movement is permitted between the plug and the manipulator claw. The support means of the first carrier and/or that of the second carrier may be resilient, being for example in the form of one or more springs or flexible members. These permitted movements enable the axial guide socket of the first carrier and the plug of the second carrier to adjust their relative positions during the connection operation in response to the various means for correcting misalignment.

Certain preferred embodiments of the invention will now be described by way of examples and with reference to the accompanying schematic drawings, in which:

FIG. 7 is an axial section of the first carrier of the second embodiment of the connecting apparatus;

FIG. 8 is an axial section of a plug of a second carrier of the second embodiment;

FIG. 9 is an axial section of a gland housing of the second carrier of the second embodiment;

FIG. 10 is an axial section of a sleeve of the second carrier of the second embodiment;

FIG. 11 is a section on the line XI—XI of FIG. 10;

FIG. 13 is a modified form of plug applicable to any of the embodiments described herein;

Figure 3:
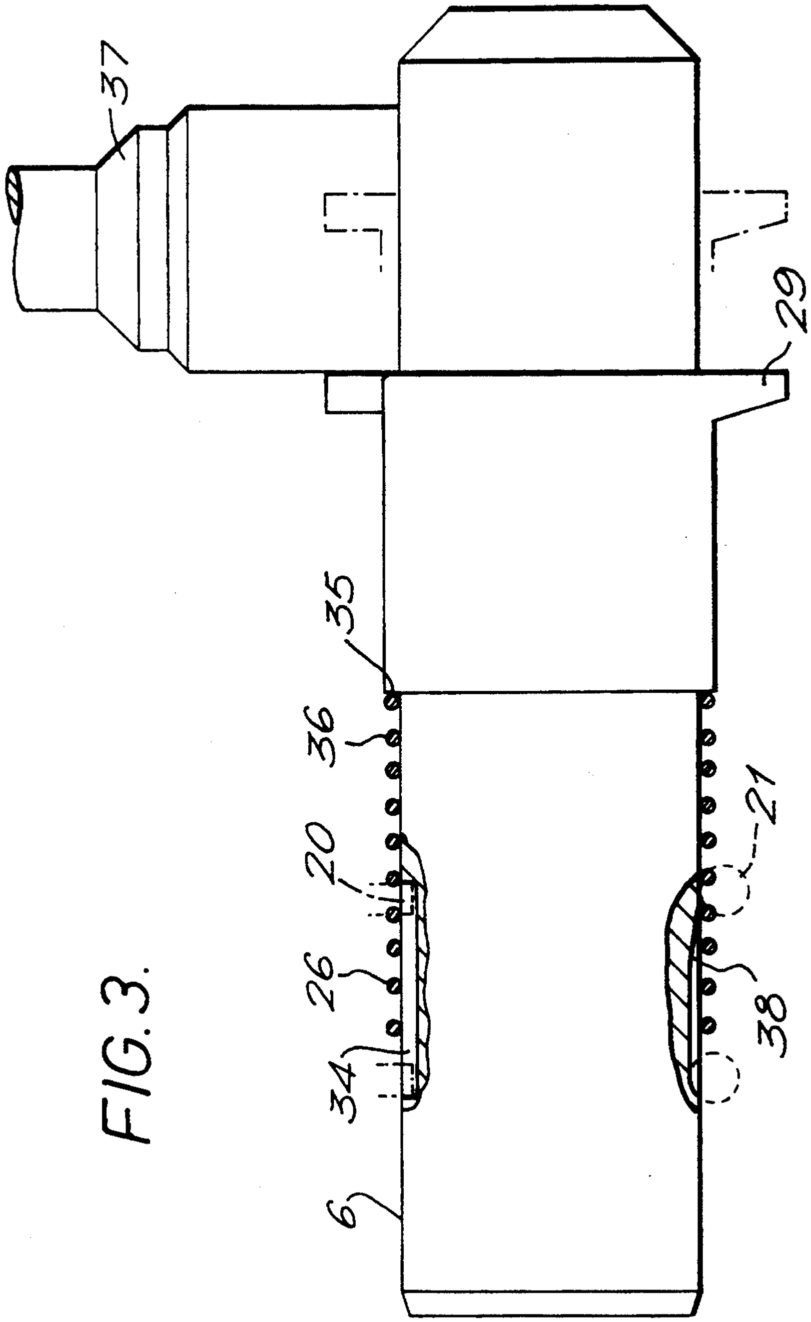
FIG. 3 is a side elevation showing a slider of the second carrier.
Figure 4:
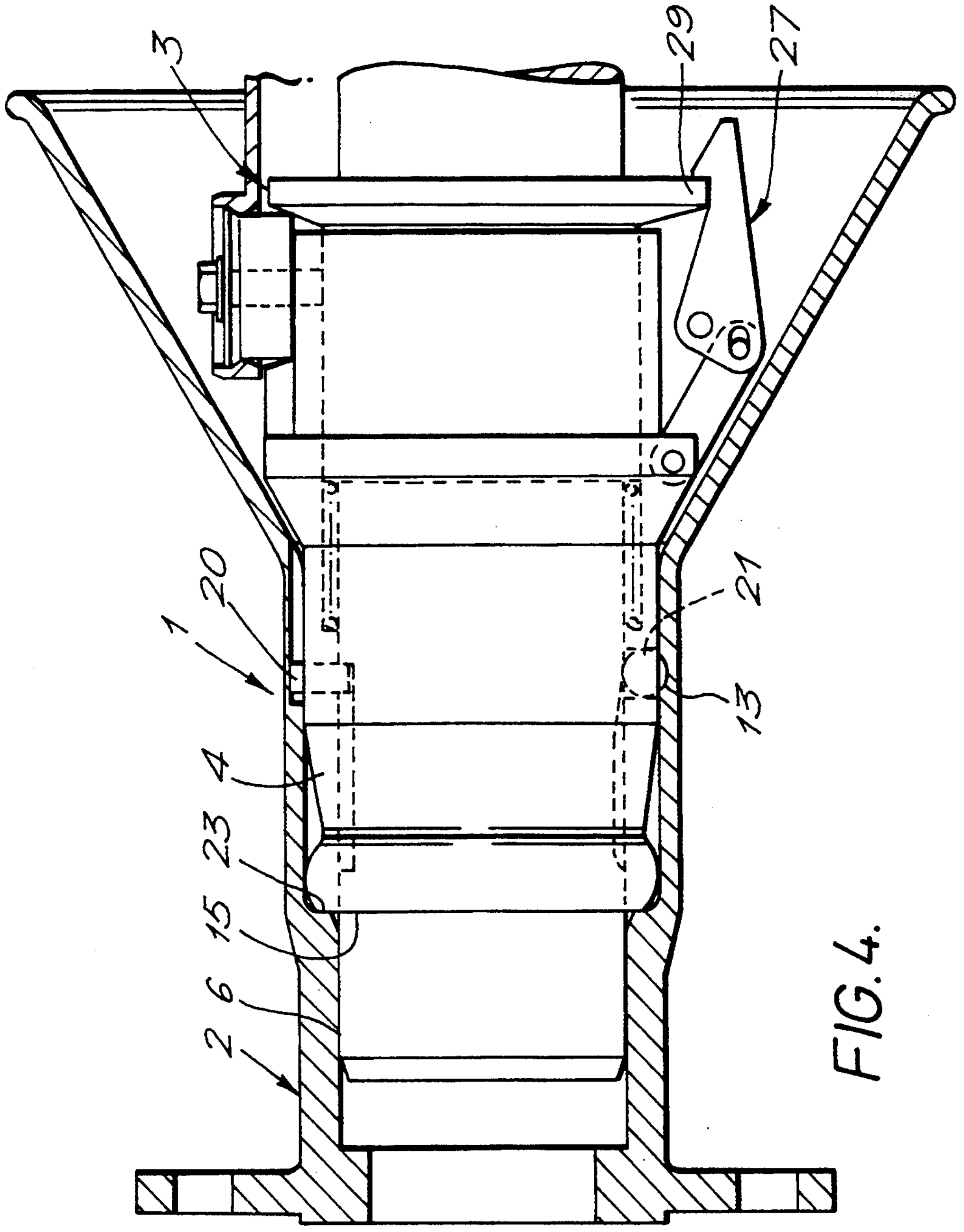
FIG. 4 is an axial section through the first and second carriers engaged together.
Figure 5:
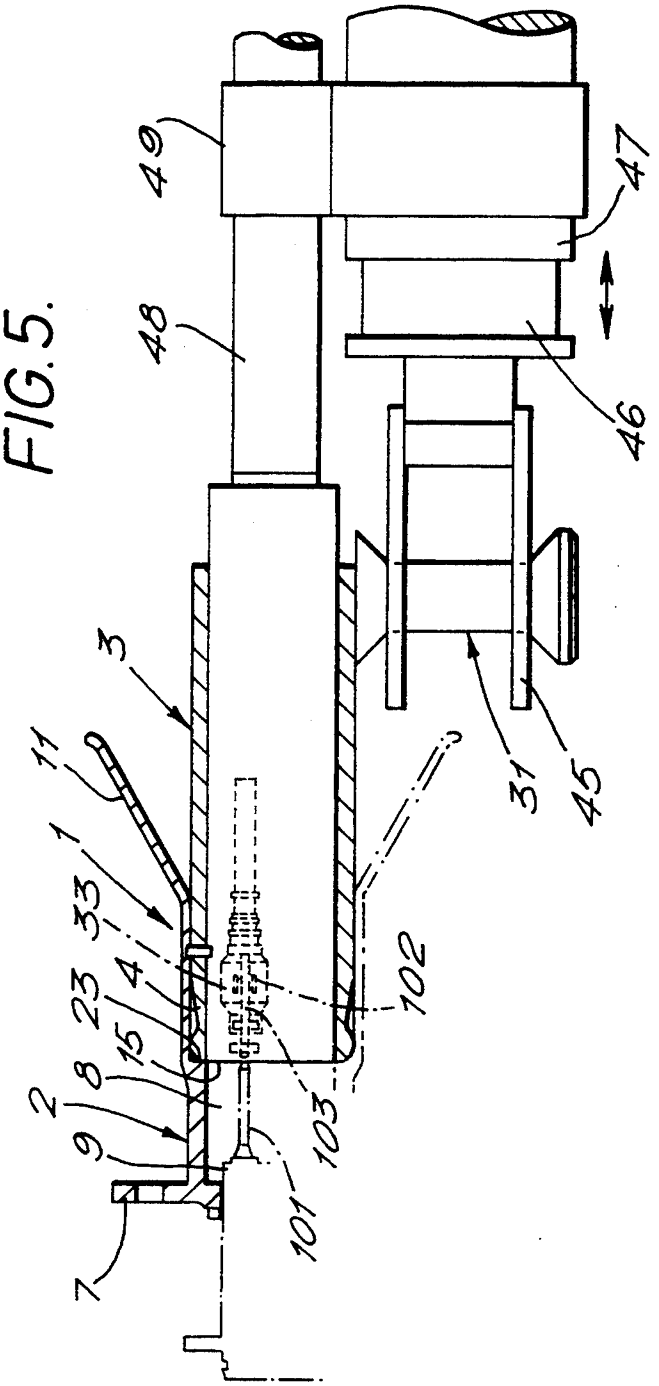
FIG. 5 shows the first and second carriers during the connection operation, together with certain parts of a ROV for connecting and disconnecting the carriers.

Referring to the first embodiment shown in FIGS. 1 to 6, the connecting apparatus 1 comprises a first carrier 2, a second carrier 3 consisting of a plug 4 and handle assembly 5, and a slider 6. As seen in FIG. 5, the first carrier 2 receives a first connector part 9 having at least one male connecting pin 101 and the second carrier 3 receives a second connector part 33 having a corresponding number of female contact sockets 103. To make a connection, each connecting pin 101 pushes back a respective shuttle piston 102 to make contact with the corresponding contact socket 103.

The first carrier has at its rear a flange 7 for connection to a seabed installation such as a wellhead, a chamber 8 for receiving the first connector part 9 (see FIG. 5), an axial guide socket 10 and a guide cone 11. The guide socket 10 is provided on its inner wall with a substantially Y-shaped slot 12 (see FIG. 6) and with a part-spherical recess 13. A stop in the form of a shoulder 23 is provided at the forward end of the guide socket 10.

Figure 1:
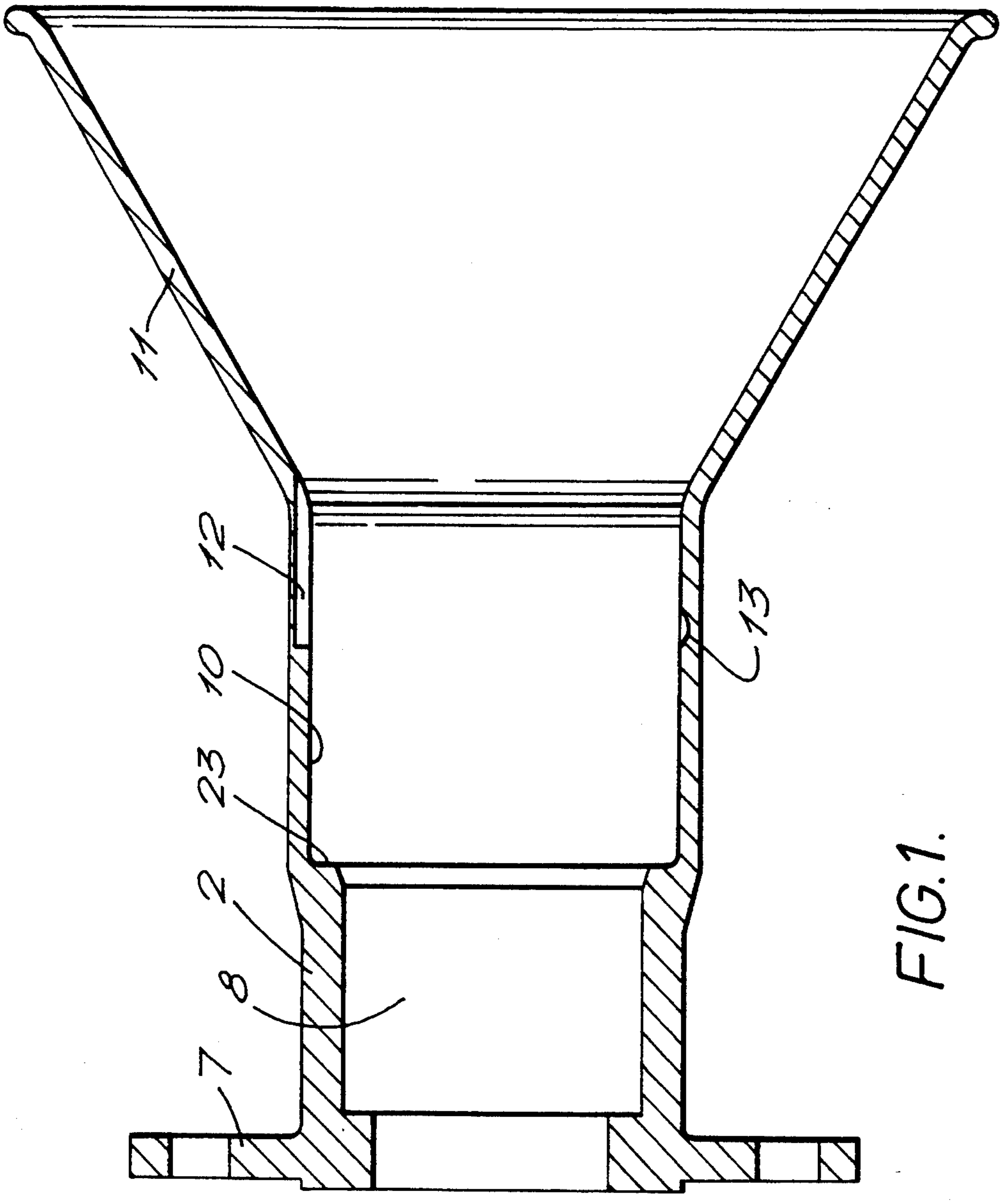
FIG. 1 is an axial section through a first carrier of a first embodiment of the connecting apparatus.
Figure 2:
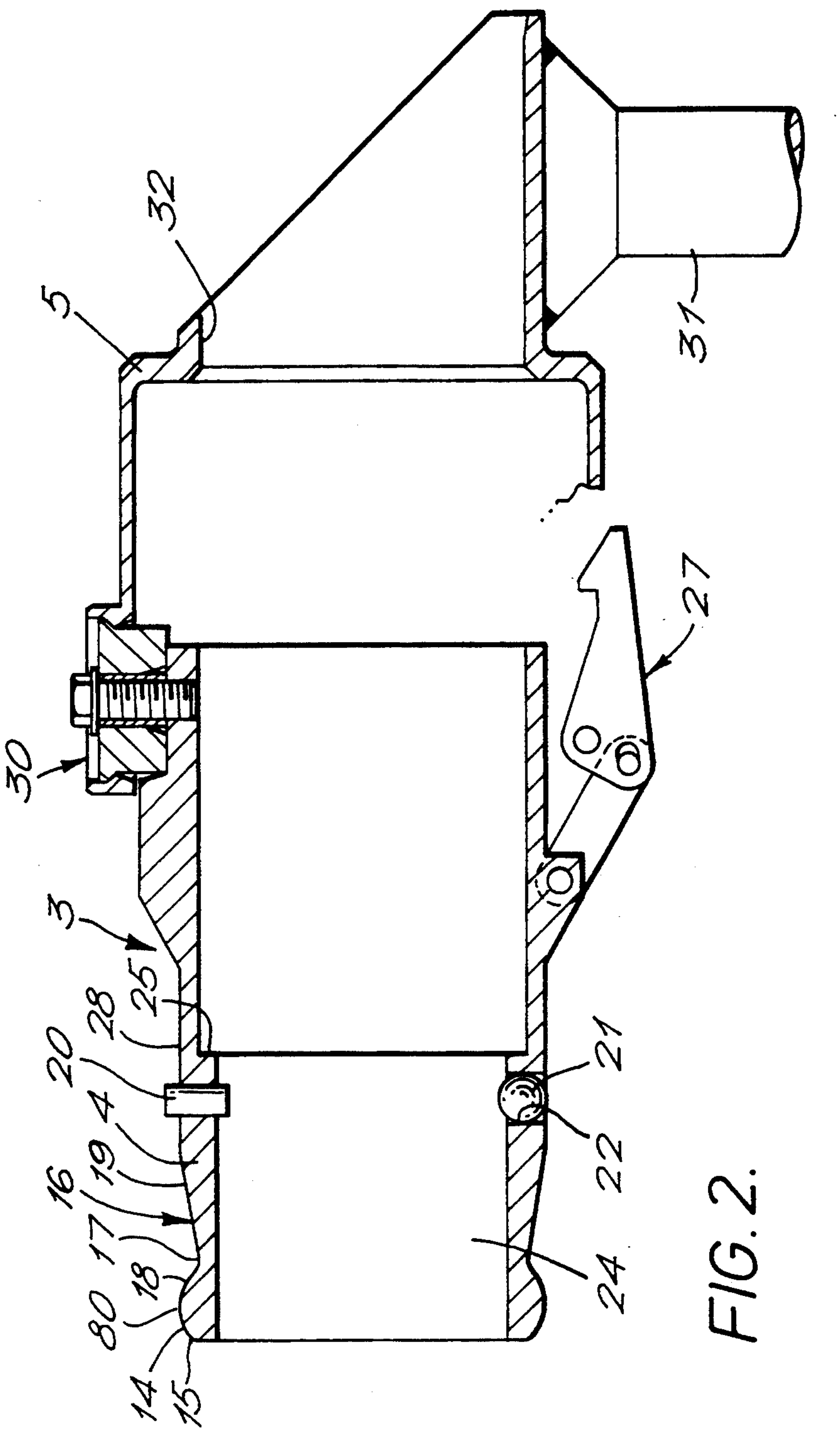
FIG. 2 is an axial section through a second carrier.

Referring to FIG. 2, the plug 4 of the second carrier part 3 has at its forward end a rounded or partly spherical nose portion 14 which tapers forwardly from a point 80 of maximum diameter to a front end 15. Rearwardly of the nose portion 14 the plug 4 has a waisted portion 16 with a point 17 of minimum diameter corresponding substantially to that of the front end 15. Forwardly of the point 17 the waist portion 16 has a front part 18 which merges with the nose portion 14. Rearwardly of the point 17 of minimum diameter the waisted portion 16 has a conical rear part 19. As viewed in axial section, part 19 is at an angle of 15° to the axial direction. A cylindrical shank portion 28 is provided to the rear of the waisted portion 16. A guide pin 20 projects radially outwardly of the shank portion 28 for engagement in the Y-shaped slot 12 of the first carrier during connection. A locking member in the form of a locking ball 21 is radially movably mounted in a radial passage 22 formed in the side wall of the shank portion 28.

The plug has an axial passage 24 for receiving the slider 6. The axial passage is provided with an abutment shoulder 25 for a spring 26 (see FIG. 3) arranged to urge the slider rearwardly relative to the plug 4. A latching mechanism 27 is secured to the plug 4 for latching the slider 6 in a forward position by engagement with a shoulder 29 provided thereon (see FIG. 3). Three flexible mounting bushes 30 are circumferentially spaced about the periphery of the rear of the plug. The bushes are supported by the handle assembly 5 which has a laterally projecting arm 31 and a rear opening 32 through which the slider 6 can be passed during assembly.

Referring to FIGS. 3 and 5, the slider 6 has a forward chamber for receiving the second connector part 33 and is arranged to fit in the axial passage 24 of the second carrier. The slider has an elongate slot 34 in which is received the inner end of guide pin 20 projecting radially inwardly from the wall of the axial passage 24, thereby ensuring correct circumferential alignment of the slider relative to the plug 4. A cam surface 38 is provided on the outside of the slider for engagement with the locking ball 21 of the plug 4, shown in FIG. 3 in dotted lines in its two alternative positions relative to the slider. The slider has a shoulder abutment 35 on which is seated the rear of a spring 36 the front of which, in the assembled condition, engages the shoulder abutment 25 of the plug 4, so as to urge the slider rearwardly relative to the plug. The shoulder 29 for engagement by the latching mechanism 27 is provided rearwardly of the shoulder 35 and at the rear of the slider 6 a gland housing 37 extends laterally to receive a cable for electrical or other services to be connected.

FIG. 4 shows the first and second carriers 2 and 3 assembled together with the slider 6 in a forward position such that the connector parts 9 and 33 are connected together, with certain details omitted for clarity. The front end 15 of the plug 4 is in abutting engagement with the shoulder 23 of the first carrier 2. The locking ball 21 is in its radially outer position in locking engagement with the recess 13 of the first carrier 2, having been urged there by forward movement of the cam surface 38 of the slider 6. The slider 6 is arrested in its forward position by the latching mechanism 27 which latches against the shoulder 29 of the slider.

Referring to FIG. 5, this shows part of a ROV having a manipulator claw 45 mounted on a telescopic boom 46 having a boom casing 47 to which a push rod 48 is secured by a clamp 49. The manipulator claw 45 grips the lateral arm 31 of the second carrier 3, the arm having a triangular form to assist gripping thereof.

The general operating sequence for connecting and disconnecting the first and second connector parts 9 and 33 will now be described with reference to FIG. 5. The first carrier 2 is secured by its flange 7 to a seabed installation and houses therein the first connector part 9. The second carrier 3 may be in a parking position on the ROV or it may be deployed on the seabed in the vicinity of the installation to which it is to be connected. The ROV locates the second carrier 3 and advances its manipulator claw 45, the telescopic boom 46 being extended by at least the stroke of the slider. Typically this may be 4–5 cm. The claw 46 is closed on the lateral arm 31 of the handle assembly and when secure the second carrier 3 is taken from its position to the first carrier 2 with the cable hanging from the gland housing 37 and trailing behind with the advance of the ROV.

A television camera (not shown) is mounted near the telescopic boom 46 and is used to view the guide cone 11 of the first carrier 2, and subsequent engagement of the second carrier with the first. The second carrier 3 is guided by the guide cone 11 of the first carrier 2 so that any lateral misalignment is corrected. This forward motion of the second carrier is achieved by a forward thrust of the ROV which locates the front end 15 of the plug 4 of the second carrier 3 against the shoulder 23 of the first carrier 2. During this forward thrust any angular axial misalignment and/or circumferential misalignment is corrected (as described below in relation to FIG. 6). Forward thrust is maintained and the telescopic boom 46 is retracted, so that the push rod 48 moves forwardly relative to the manipulator claw 45 which grips the arm 31 of the handle assembly 5. The push rod 48 engages the rear of the slider 6 and pushes it forwardly so that the second connector part 33 is connected with the first connector part 9. Forward movement of the slider also results in cam surface 38 of the slider urging the locking ball 21 of the plug 4 to a radially outer position in locking engagement with the locking recess 13 of the first carrier 2. The slider is secured in its forward position relative to the plug 4 by engagement of the latching mechanism 27 on the shoulder 29. The connector parts are now fully mated and the first and second carriers which house them are locked together. The manipulator claw 45 is then released from the arm 31 of the handle assembly and the ROV thrusts clear.

For disconnection, the ROV locates the connecting apparatus 1 and advances to it. Manipulator claw 45 is opened and the telescopic boom 46 is fully retracted. The claw grips the arm 31 and the ROV thrusts rearwardly, exerting a force on the handle assembly 5 against the flexible mounting bushes 30. The arrangement is such that this causes opening of the latching mechanism 27, so that the slider is released. It can however move back only a small distance since further rearward movement is prevented by engagement against the front end of the push rod 48. Rearward thrusting of the ROV is stopped and the telescopic boom 46 is extended so that the push rod 48 moves rearwardly relative to the manipulator claw 45 holding the arm 31 of the handle assemble 5. This enables the slider fully to retract under the action of the spring 26 and during retraction the locking ball 21 is freed from the locking recess 13. Also during retraction the second connector part 33 is disengaged from the first connector part 9. The ROV thrusts rearwardly and the second carrier 3 is removed from the first carrier 2.

A second embodiment is shown in FIGS. 7-12 and where appropriate the same reference signs have been used as in respect of the first embodiment. The first carrier 2 shown in FIG. 7 has a flange 7, a chamber 8 for receiving a first connector part 9 (see FIG. 12), an axial guide socket 10 and a guide slot 12 (see FIG. 12), as in the first embodiment. The first carrier 2 differs from that of the first embodiment in that at its forward end it does not have a guide cone but rather it includes a plurality of locking balls 50 (see FIG. 12) at circumferentially spaced locations. Each ball 50 is received in a radial hole 51 through the side wall of the first carrier 2.

FIG. 8 shows the plug 4 of the second carrier 3. The plug 4 has, as in the first embodiment, a nose portion 14 with a front end 15 and a waisted portion 16 with a point of minimum diameter 17 in front of which is located a front part 18 of the waisted portion and behind which is located a rear part 19 of the waist portion. To the rear of the waisted portion the plug has a shank portion 28. A guide pin 20 (see FIG. 12) projects radially outwardly of the shank portion 28 for engagement in the slot 12. To the rear of the shank portion the plug 4 is provided with a locking recess in the form of an annular groove 52 for receiving the locking balls 50.

Figure 12:
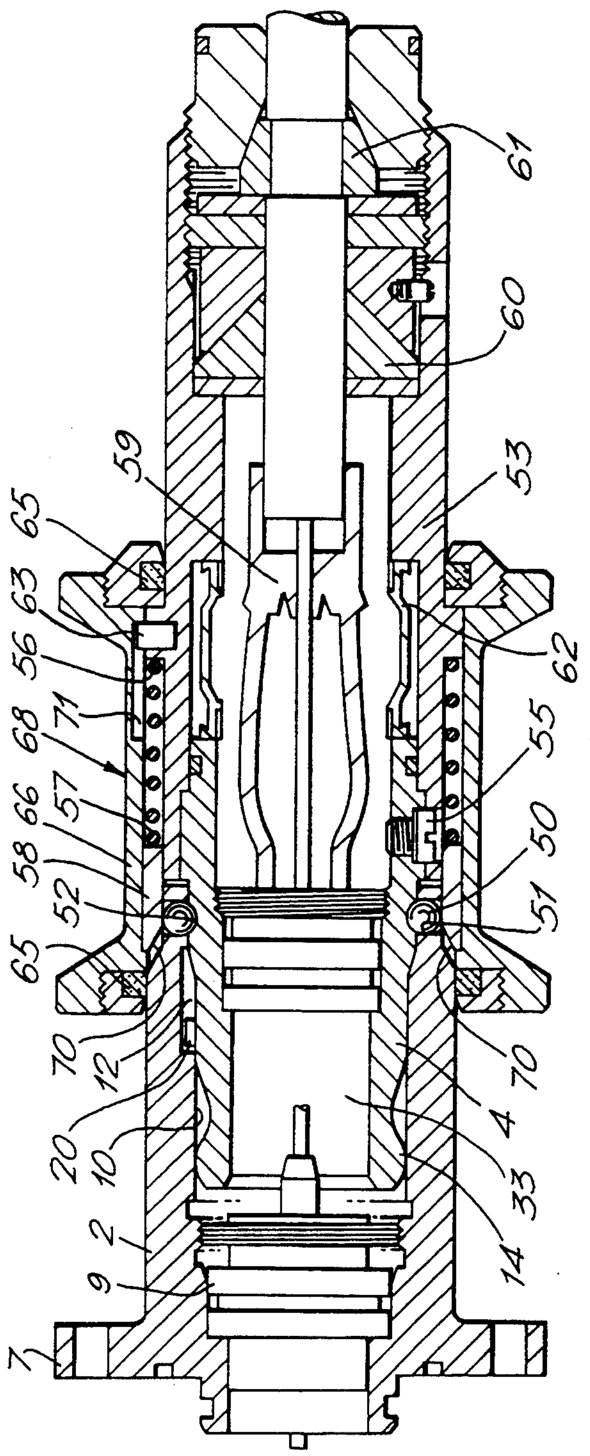
FIG. 12 is an axial section of the first and second carrier parts of the second embodiment engaged together.
Figure 14:
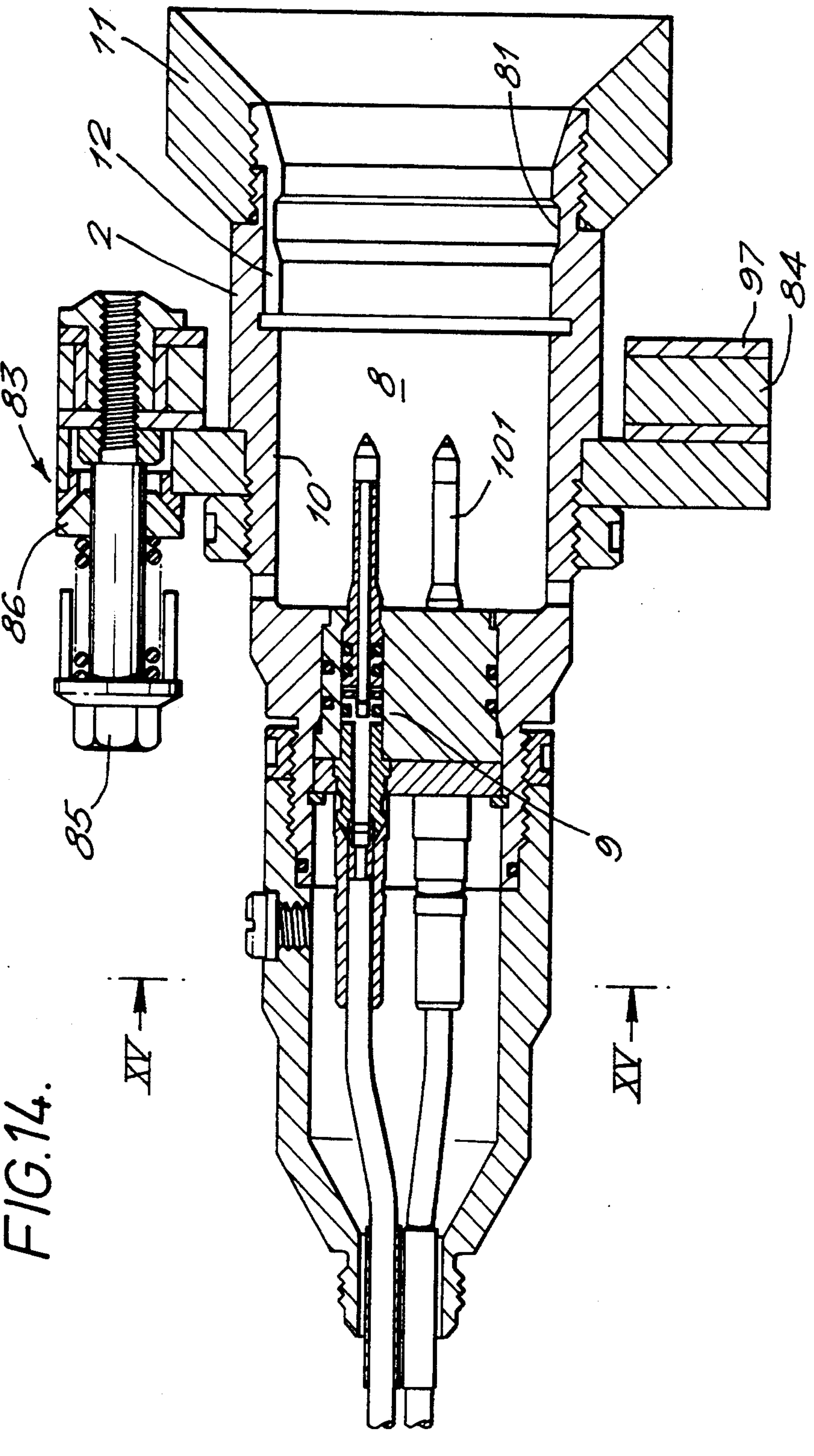
FIG. 14 is an axial section through a first carrier of a third embodiment of the connecting apparatus, on the lines XIV—XIV of FIG. 15.
Figure 15:
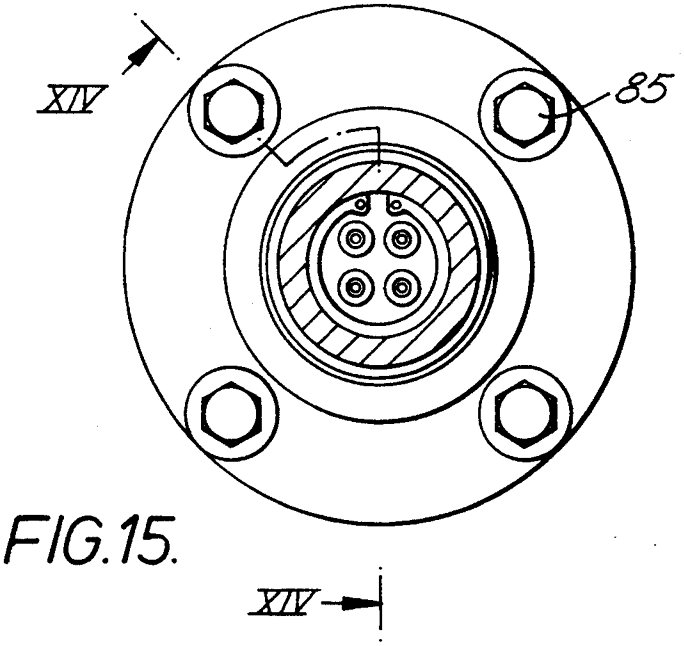
FIG. 15 is a cross section on the lines XV—XV of FIG. 14.

FIG. 9 shows a gland housing 53 of the second carrier 3. Referring to FIGS. 9 and 12, at its forward end the gland housing 53 has three equi-spaced holes 54 for securing the housing to the plug 4 by connecting screws 55. The gland housing 53 has a forward facing shoulder 56 which seats the rear of a spring 57 the front of which acts on a retaining ring 58. The retaining ring 58 is thus axially movable on the outside of the gland housing 53 and is forwardly resiliently biased by the spring. The retaining ring has a slanted leading edge 70. The gland housing 53 receives a cable termination boot and sleeve 59, a gland seal 60, and a cable collet 61. A pressure compensation boot 62 is also housed by the gland housing part 53. A sleeve orientation pin 63 projects radially outwardly from the gland housing 53.

A sleeve 68 is shown in FIGS. 10 and 11. The sleeve 68 has at its forward and rear ends respective annular recesses 64 for receiving compressed felt seals 65 (see FIG. 12) to inhibit ingress of contamination into the connecting apparatus when connected. The central portion 66 of the sleeve has an outer surface 67 which as viewed in FIG. 11 is of a shape suitable for being gripped by a manipulator claw of a ROV. On the inside of the sleeve an elongate slot 71 is provided for engagement by the sleeve orientation pin 63.

Figure 6:
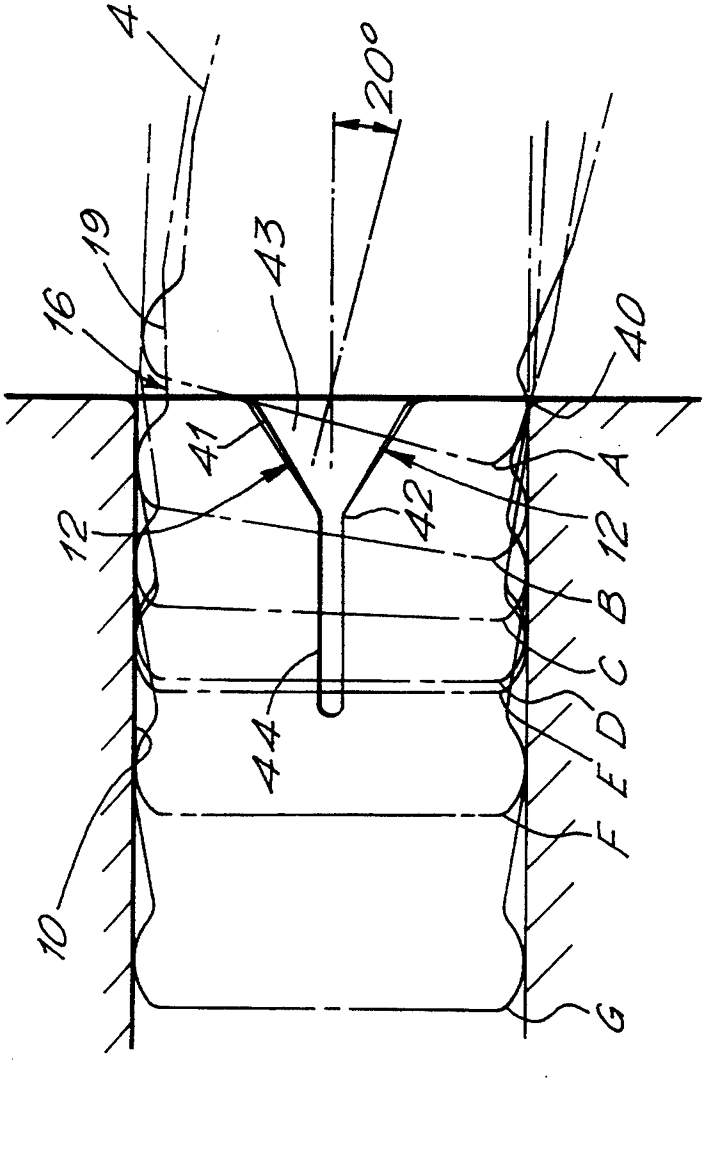
FIG. 6 shows a sequence of steps of operation of a second embodiment of the connecting apparatus, during engagement of the plug part of a second carrier in an axial socket of a first carrier.

FIG. 6 shows certain steps of operation of the second embodiment (FIGS. 7 to 12), during engagement of the plug 4 in the axial guide socket 10 with an initial angular axial misalignment of 20°. The sequential positions of the plug are denoted by reference signs A-G. At position A the nose portion has made contact with the inner wall of the guide socket 10, entry of the nose portion having been made possible due to the fact that it tapers forwardly to a front end having a lateral dimension less than that of the guide socket. At position B the nose portion has penetrated further into the guide socket and the rear part 19 of the waisted portion 16 is in engagement at point 40 with the open end of the guide socket. Further axial movement of the nose portion into the guide socket results in axial alignment of the nose portion with the guide socket caused by camming engagement of the rear part 19 of the waisted portion 16 with the open end of the guide socket. Thus the nose portion moves from position B via position C to position D where axial alignment is achieved. Shortly thereafter, at position E, the guide pin 20 (see FIG. 12) first enters the Y-shaped slot 12 and engages a side wall 41 thereof if there is any circumferential misalignment. Such misalignment is corrected by movement of the pin along the side wall which rotates the plug 4 relative to the guide socket as necessary until position F is reached, when the pin 20 is at point 42, at the junction between funnel shaped portion 43 and an elongate keyway 44 parallel to the axial direction. At position F the first and second connector parts are in alignment, ready for mating. The plug then moves from position F to position G whilst being guided by engagement of the pin 20 in the elongate keyway 44. During movement from position F to position G the connection between the first and second connector parts is effected.

The connecting sequence of the second embodiment will now be described with reference to FIG. 12. A manipulator claw of a ROV grips the body portion 66 of the sleeve 68 which surrounds the gland housing 53, the retaining ring 58 and the rear part of the plug 4. The rear seal 65 of the sleeve 66 engages the outer body of the gland housing part 33 whilst the front seal 65 is free. The manipulator claw carries the sleeve and the other components towards the first carrier 2 until the nose portion 14 engages in the open end of the axial guide socket 10. As described above, the nose portion 14 and waisted portion 16 operate to correct any angular axial misalignment between the plug 4 and the guide socket 10. The pin 20 of the plug 4 engages in the slot 12 to correct any circumferential misalignment, as described above. The plug 4 is advanced fully into the guide socket 10 to connect the second connector part 33 to the first connector part 9. When the plug moves into its fully forward position in the first carrier 2 the annular recess 52 of the plug lines up with the locking balls 50 which are then able to move radially inwardly into locking engagement with the recess. The locking balls are urged into this position by the slanted leading edge 70 of the retaining ring which is urged forwardly under the force of the spring 57. The first and second carrier parts are then locked together by engagement of the locking balls 51 in the annular recess 52, the balls being held in the locking position by the retaining ring 58. In this condition the front seal 65 of the sleeve 68 forms a protective seal with the outside of the first carrier 2. During the connecting operation the forward movement is provided by forward thrusting of the ROV.

To disconnect the second connector part 33 from the first connector part 9 the ROV applies a reverse thrust and urges the sleeve 68 axially rearwardly. Initially the second carrier 3 cannot move rearwardly as it is locked to the first carrier 2. However, the sleeve 68 is able to move rearwardly relative to the second carrier and in so doing is guided by the pin 63 which engages in the elongate slot 71 of the sleeve, the rear seal 65 sliding rearwardly on the outside of the gland housing 53. The sleeve moves the retaining ring 58 against the force of the spring 57 so as to permit the locking balls 51 to disengage from the locking recess 52. Continued rearward movement of the sleeve removes the unlocked second carrier from the first carrier to effect the desired disconnection.

FIG. 13 shows a modified plug 4 in which the nose portion 14 and the front part 18 of the waisted portion 16 are conical rather than part spherical, there being a short land 90 therebetween.

A third embodiment is shown in FIGS. 14–18 and where appropriate the same reference signs have been used as in respect of the first embodiment. The first carrier 2 shown in FIGS. 14 and 15 has a chamber 8 for receiving a first connector part 9 having male contact pins 101, an axial guide socket 10, a guide cone 11 and a substantially Y-shaped guide slot 12, as in the first embodiment. The second carrier 3 shown in FIGS. 16–18 has a plug 4 and handle assembly 5. The plug 5 has a nose portion 14 with a front end 15 and a waisted portion 16 with a region of minimum diameter 17 in front of which is located a front part 18 of the waisted portion and behind which is located a rear part 19 of the waisted portion, as in the first embodiment. To the rear of the waisted portion 16 the plug has a shank portion 28 from which a guide pin 20 projects radially outwardly for engagement in the slot 12. The second connector part 33 is mounted in the second carrier 3 and has shuttle pistons 102 extending through female contact sockets 103 for engagement by the male contact pins 101.

Certain important features of the third embodiment will now be described.

The guide socket 10 includes an annular groove 81 for receiving a snap ring 82, which is preferably a split ring, so as to lock the first 2 and second 3 carriers together when the first 9 and second 33 connectors are mated. This locking mechanism allows the connectors to be mated and unmated by a simple push/pull operation. The profiles of the groove 81 and the ring 82 maintain the first and second carriers in a locked condition until a separation load of about 150–200N is applied by the ROV. In comparison with the first embodiment, the third embodiment does not require an axially movable sleeve within the plug, so that for a given diameter of the second connector part 33, a plug 4 of smaller diameter can be used. This means that a guide cone 11 of the same size gives a greater target area, relative to the size of the plug. Thus the ability to correct lateral misalignment between the first and second carriers during the connection operation is improved, for example by ±20 mm.

The first carrier 2 is provided with a mounting system 83 for mounting the carrier 2 to a bulkhead 84 of e.g. a seabed installation. This is in the form of four mounting bolts 85 with spring loaded conical washers 86. The mounting system thus mounts the carrier 2 on the bulkhead 84 in a manner permitting limited movement of the carrier. The carrier 2 can tilt resiliently on the bulkhead relative to the axial direction by e.g. ±5°.

Figure 18:
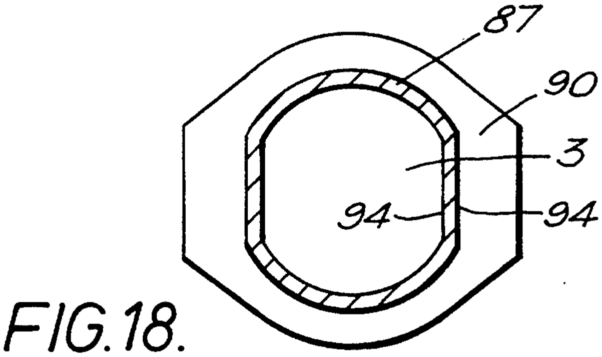
FIG. 18 is a cross section on the lines XVIII—XVIII of FIG. 16.
Figure 16:
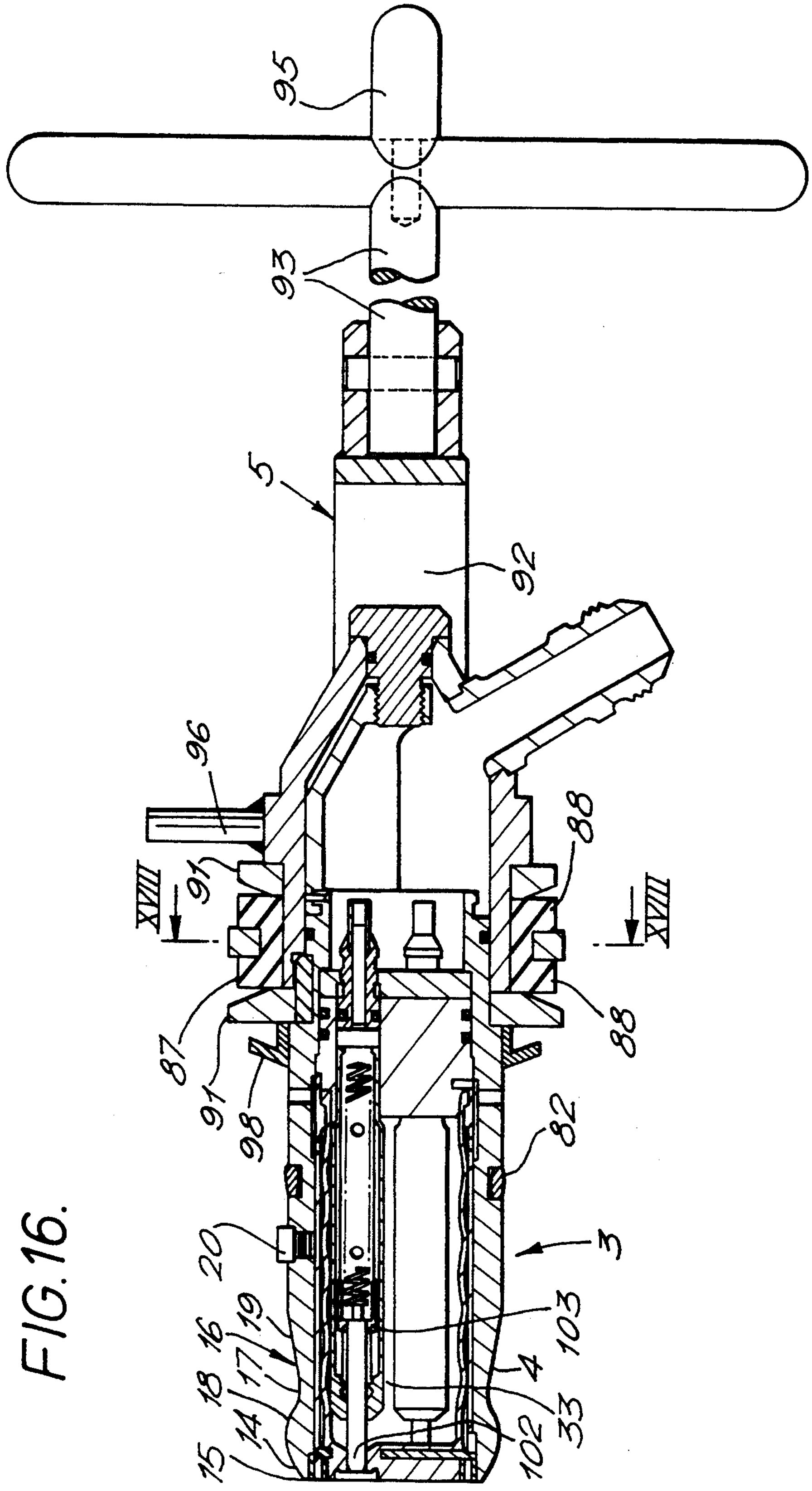
FIG. 16 is an axial section through a second carrier of the third embodiment.
Figure 17:
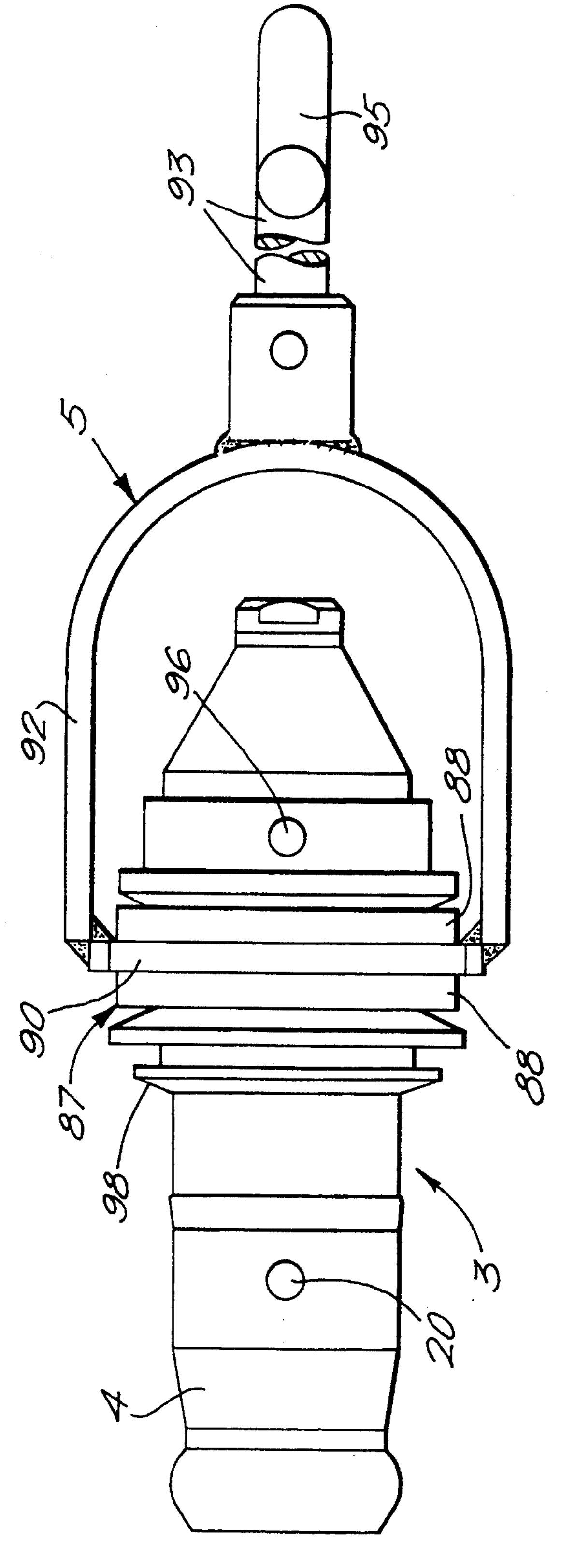
FIG. 17 is a plan view of the second carrier of FIG. 16.

The second carrier 3 shown in FIGS. 16–18 is also arranged to provide support for the plug 4 which permits limited movement thereof. A large flexible washer 87 (of rubber or other flexible material) is mounted on the plug 3 between axially spaced abutment rings 91 having chamfered faces. The plug 3 has integral end flanges 88 which define therebetween an annular groove 89. A support ring 90 of the handle assembly 5 is received in the groove 89 and is welded to a stirrup 92 which is in turn welded to a T-bar 93. The plug 4 is thus mounted on the handle assembly 5 in a manner permitting limited movement of the plug. The plug can tilt resiliently on the support ring 90 relative to the axial direction by e.g. ±10°.

Referring to FIG. 18, the portion of the plug 4 engaged by the flexible washer 87, the flexible washer 87 itself and the support ring 90 are all formed with respective flat surfaces 94 which resist torsional loading. The flexible washer 87 also provides compliance in the torsional direction.

The T-bar 93 of the handle assembly 5 is provided with a rearwardly projecting stabilising pawl 95. When the ROV manipulator claw grips the vertical portion of the T-bar the pawl 95 prevents rotation of the handle assembly 5 about the vertical axis.

The plug 4 has a peg 96 protruding radially outwardly front its backshell (see FIGS. 16 and 17). The mounting system 83 for the carrier 2 includes a backing plate 97 (see FIG. 14) which has a radially extending orientation line marked on it (not shown). The backing plate 97 may for example be made from yellow Trafalite (trade mark) sheet with a large black orientation line engraved into it. During the connection operation, a television camera mounted on the ROV manipulator arm sights the peg 96 of the plug 4 on to the orientation line so as to align the guide pin 20 with the slot 12.

The second carrier 3 is provided with a flexible annular seal 98 which has an L-shape as viewed in axial section. In use, the seal 98 engages the guide cone 11 of the first carrier 2 and forms a seal which prevents contaminants such as sand from entering the area of the snap ring 82.

In use, the first 2 and second 3 carrier parts are brought together to connect together the first 9 and second 33 connector parts received in the respective carriers. In particular, the male pins 101 of the first connector part push back the shuttle pistons 102 of the second connector part 33 so as to make contact with the female contact sockets 103. It may be desired to provide an indication method to show when the connector parts are fully engaged, for example by movement of a member visible by the television camera. When full engagement is achieved, the snap ring 82 latches into the groove 81.

Angular misalignment in the axial direction between the carriers is corrected by the shape of the front end of the plug 4, as described in relation to FIG. 6. Lateral misalignment is corrected by the guide cone 11 and circumferential misalignment is corrected by the Y-shaped slot 12, again as described in relation to FIG. 6. The supporting arrangements for the first carrier 2 on the bulkhead 84 and for the plug 4 on the handle assembly 5 (which is gripped by the ROV manipulator arm) permit any necessary relative correcting movement to take place. When the ROV manipulator arm releases the handle assembly 5 the resilience of the supporting arrangements permits them to return to their unflexed positions.

The third embodiment of FIGS. 14–17 is particularly suitable for a so-called free swimming ROV where a high degree of misalignment may be expected. It is however also suitable for a ROV which docks before the connection is made, thus establishing a fixed position relative to the bulkhead 84 on which the first carrier 2 is mounted.

Unless otherwise stated, the various components of the connecting apparatus may be of stainless steel, aluminium bronze or monel.

We claim:

1. Apparatus for connecting first and second parts of an under water connector, comprising a first carrier adapted to receive the first connector part and having an axial guide socket, and a second carrier adapted to receive the second connector part and having a plug arranged to engage axially in the guide socket for connection of the first and second connector parts, wherein the plug has a nose portion which tapers forwardly to a front end having a lateral dimension less than that of the guide socket, and a waisted portion rearwardly of the nose portion with a lateral dimension less than that of the guide socket.

2. Apparatus as claimed in claim 1, further comprising means for correcting circumferential misalignment of the first and second carriers.

3. Apparatus as claimed in claim 2, wherein the circumferential misalignment correction means comprises a pin provided on one of the two carriers for engagement during connection with a slot provided on the other carrier, the slot having an open end for first receiving the pin during connection and being wider than the pin, and the slot narrowing from the open end so as to guide the pin to a desired circumferential position during connection.

4. Apparatus as claimed in claim 3, wherein the relative locations of the pin and slot on their respective carriers are such that during connection the pin first enters the slot once the nose and waisted portions of the plug have entered the guide socket.

5. Apparatus as claimed in claim 1, wherein the second carrier includes a guide cone which converges towards the guide socket.

6. Apparatus as claimed in claim 1, further comprising locking means for locking together the first and second carriers when the first and second connectors are connected.

7. Apparatus as claimed in claim 6, wherein the locking means comprises a locking member provided on one of the two carriers and resiliently engageable in a recess provided on the other carrier.

8. Apparatus as claimed in claim 7, wherein the locking means comprises a ring resiliently engageable in a groove.

9. Apparatus as claimed in claim 6, wherein the locking means comprises a locking member movable to a position locking together the first and second carrier parts, and retaining means provided on one of the carriers and operable by axial movement thereof towards the other carrier to retain the locking member in the locking position, and operable by axial movement thereof away from the other carrier to release the locking member.

10. Apparatus as claimed in claim 1, wherein at least one of the axial guide socket of the first carrier and the plug of the second carrier is provided with support means arranged to permit limited movement of the guide socket and/or the plug relative to a respective support therefor.

11. Apparatus as claimed in claim 4, wherein the second carrier includes a guide cone which converges towards the guide socket.

12. Apparatus as claimed in claim 4, further comprising locking means for locking together the first and second carriers when the first and second connectors are connected.

13. Apparatus as claimed in claim 5, further comprising locking means for locking together the first and second carriers when the first and second connectors are connected.

14. Apparatus as claimed in claim 11, further comprising locking means for locking together the first and second carriers when the first and second connectors are connected.

15. Apparatus as claimed in claim 3, wherein the second carrier includes a guide cone which converges towards the guide socket.

16. Apparatus as claimed in claim 6, further comprising means for correcting circumferential misalignment of the first and second carriers.

17. Apparatus as claimed in claim 16, wherein the circumferential misalignment correction means comprises a pin provided on one of the two carriers for engagement during connection with a slot provided on the other carrier, the slot having an open end for first receiving the pin during connection and being wider than the pin, and the slot narrowing from the open end so as to guide the pin to a desired circumferential position during connection.

18. Apparatus as claimed in claim 17, wherein the relative locations of the pin and slot on their respective carriers are such that during connection the pin first enters the slot once the nose and waisted portions of the plug have entered the guide socket.

19. Apparatus as claimed in claim 18, wherein the second carrier includes a guide cone which converges towards the guide socket.

20. Apparatus as claimed in claim 19, wherein at least one of the axial guide socket of the first carrier and the plug of the second carrier is provided with support means arranged to permit limited movement of the guide socket and/or the plug relative to a respective support therefor.

21. Apparatus as claimed in claim 9, wherein the second carrier includes a guide cone which converges toward the guide socket.

22. Apparatus as claimed in claim 9, further comprising means for correcting circumferential misalignment of the first and second carriers.

23. Apparatus as claimed in claim 1, wherein the waisted portion further comprises a rear part of increasing lateral dimension in its rearward direction, said rear part being engageable with the edge of the guide socket at its open end to cause correction of any angular misalignment occurring during a connection operation.

* * * * *